(12) United States Patent
Callahan et al.

(10) Patent No.: US 12,339,038 B2
(45) Date of Patent: Jun. 24, 2025

(54) OHMIC HEATER WITH FLOW RATE MEASUREMENT

(71) Applicant: OhmIQ, Inc., North Charleston, SC (US)

(72) Inventors: Jeremiah M. Callahan, Sullivan's Island, SC (US); Michael J. Wieckowski, Charleston, SC (US)

(73) Assignee: OHMIQ, INC., North Charleston, SC (US)

( * ) Notice: Subject to any disclaimer, the term of this patent is extended or adjusted under 35 U.S.C. 154(b) by 1160 days.

(21) Appl. No.: 17/181,283

(22) Filed: Feb. 22, 2021

(65) Prior Publication Data

US 2021/0285688 A1 Sep. 16, 2021

Related U.S. Application Data

(60) Provisional application No. 62/980,530, filed on Feb. 24, 2020.

(51) Int. Cl.
*F24H 9/1818* (2022.01)
*F24H 1/10* (2022.01)
(Continued)

(52) U.S. Cl.
CPC .......... *F24H 9/1818* (2013.01); *F24H 1/106* (2013.01); *G01F 1/64* (2013.01); *G01F 1/684* (2013.01); *G01N 27/08* (2013.01); *H05B 3/0009* (2013.01)

(58) Field of Classification Search
None
See application file for complete search history.

(56) References Cited

U.S. PATENT DOCUMENTS 2,603,089 A * 7/1952 Morley ................. G01F 1/7044
73/861.95
3,374,672 A * 3/1968 Horne ...................... G01F 1/64
324/439

(Continued)

FOREIGN PATENT DOCUMENTS

WO 2006119440 A2 11/2006

OTHER PUBLICATIONS

International Search Report including Written Opinion for PCT/US2021/018985 issued May 31, 2021; 12 pages.

*Primary Examiner* — Thor S Campbell
(74) *Attorney, Agent, or Firm* — CARTER, DELUCA & FARRELL LLP

(57) ABSTRACT

A flowmeter for measuring flow of a conductive liquid includes a structure (20, 220) defining a flow path, electrodes in the flow path and electrodes (34a, 34b, 234a, 234b) exposed within the flow path. An electrical circuit (40, 240) applies a voltage between the electrodes so that an electrical current flows along a conduction path between the electrodes within a liquid flowing in the flow path. Means such as temperature sensors (56, 58, 256, 258) are provided for determining a value representing a temperature rise in the liquid passing through a sensing region of the flow path which encompasses at least a part of the. A monitoring circuit (60, 207) determines a value representing the flow rate based on the value representing the temperature, rise the voltage and the current. The flowmeter may be incorporated in an ohmic heater and elements of the ohmic heater may serve as elements of the flowmeter.

20 Claims, 2 Drawing Sheets

(51) Int. Cl.
*G01F 1/64* (2006.01)
*G01F 1/684* (2006.01)
*G01N 27/08* (2006.01)
*H05B 3/00* (2006.01)

(56) References Cited

U.S. PATENT DOCUMENTS

| | | | | | |
|---|---|---|---|---|---|
| 3,399,566 | A * | 9/1968 | Brown | ................ | G01P 5/18 |
| | | | | | 73/170.12 |
| 3,835,705 | A * | 9/1974 | Hadjidjanian | ............ | G01F 1/64 |
| | | | | | 73/861.09 |
| 3,996,795 | A * | 12/1976 | Servassier | ................ | G01F 1/64 |
| | | | | | 73/861.09 |
| 4,074,572 | A * | 2/1978 | Bullis | ................ | G01F 1/64 |
| | | | | | 73/861.09 |
| 4,136,564 | A * | 1/1979 | Suzuki | ................ | G01F 1/64 |
| | | | | | 73/861.09 |
| 4,393,719 | A * | 7/1983 | Wiegand | ............ | G01F 1/7088 |
| | | | | | 73/861.05 |
| 5,247,836 | A * | 9/1993 | Lew | ................ | G01F 1/64 |
| | | | | | 73/861.08 |
| 6,604,053 | B2 * | 8/2003 | Fematt | ................ | A01J 5/01 |
| | | | | | 702/50 |
| 8,248,076 | B2 * | 8/2012 | Schaenzlin | ............ | G01N 27/60 |
| | | | | | 324/464 |
| 10,365,013 | B1 * | 7/2019 | Wieckowski | ............ | F24H 9/1818 |
| 2019/0271487 | A1 * | 9/2019 | Callahan | ............ | F24H 15/37 |
| 2021/0153302 | A1 * | 5/2021 | Wieckowski | ............ | F24H 1/202 |
| 2021/0285688 | A1 * | 9/2021 | Callahan | ............ | H05B 3/60 |
| 2023/0408144 | A1 * | 12/2023 | Atkins | ............ | F24H 9/2028 |
| 2024/0369390 | A1 * | 11/2024 | Caoduro | ............ | G01F 1/7082 |

\* cited by examiner

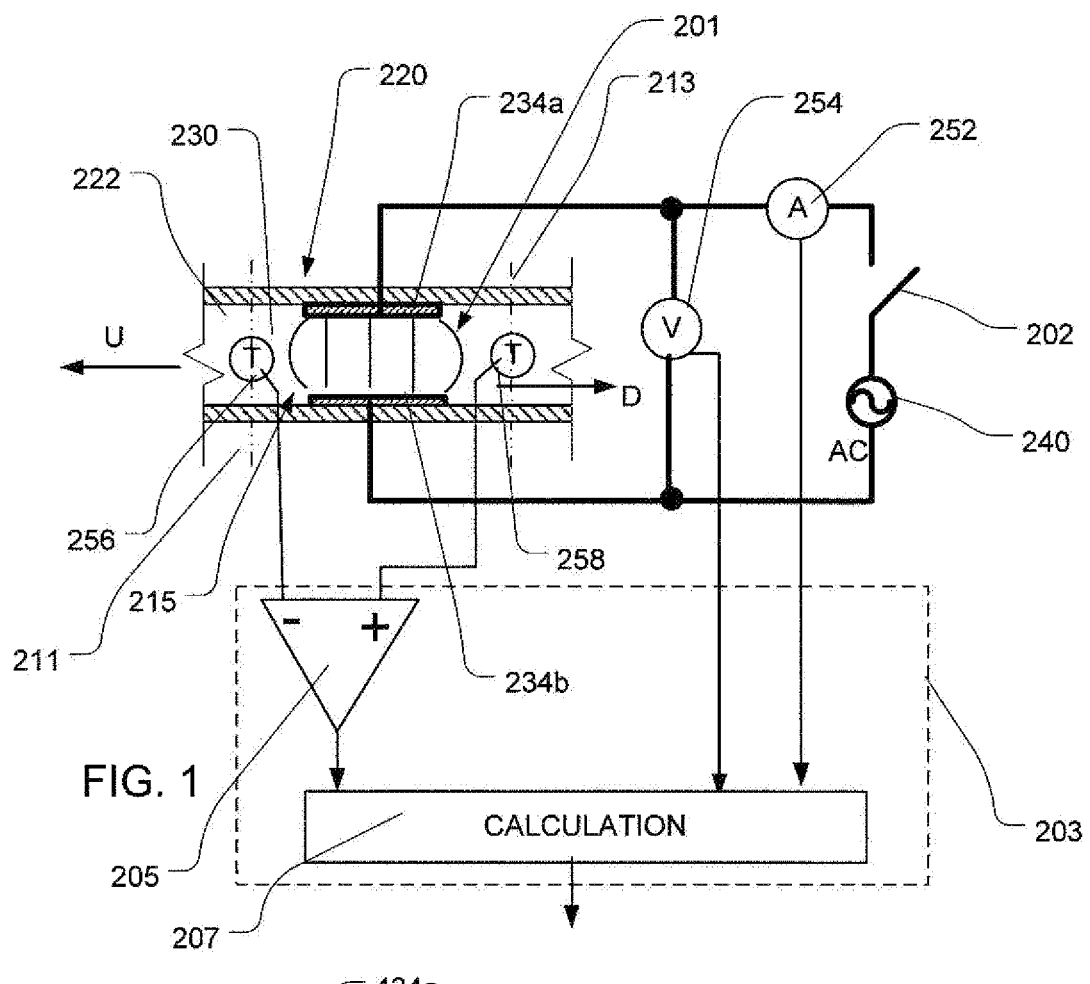
FIG. 1
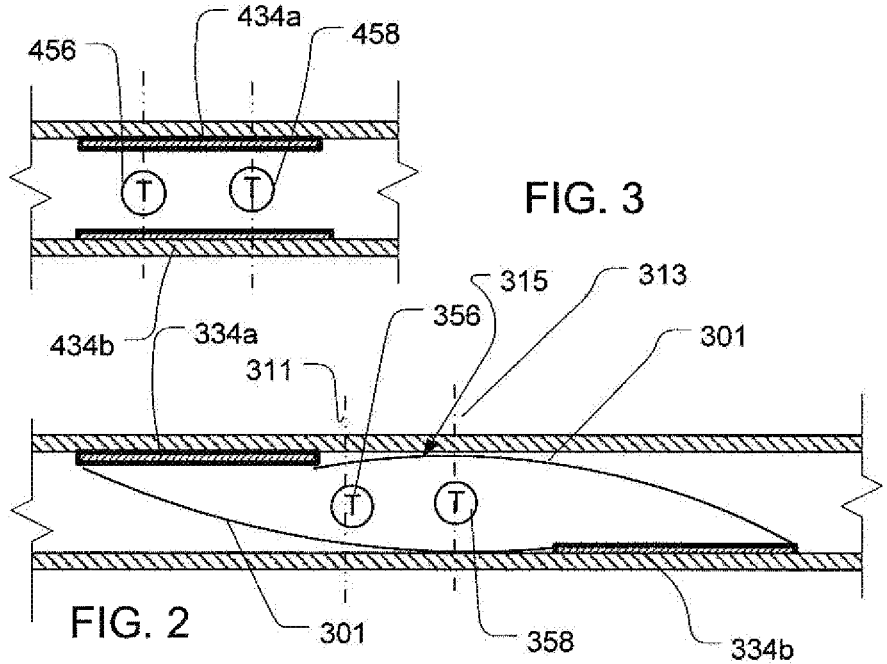
FIG. 3
FIG. 2

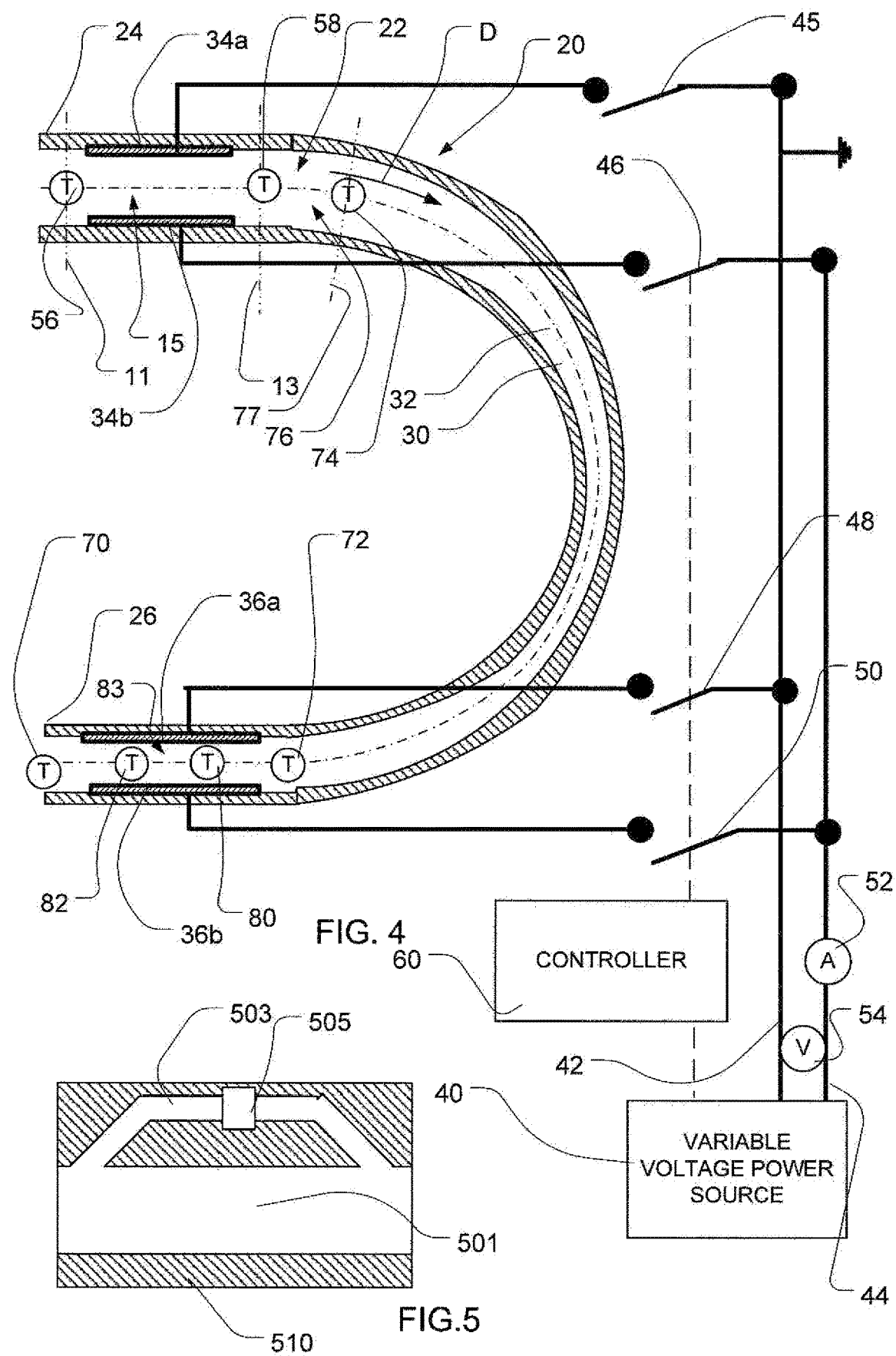

OHMIC HEATER WITH FLOW RATE MEASUREMENT

CROSS REFERENCE TO RELATED APPLICATIONS

The present application claims benefit of U.S. Provisional Patent Application 62/980,530, filed Feb. 24, 2020, the disclosure of which is incorporated by reference herein.

BACKGROUND OF THE INVENTION

The present disclosure relates to ohmic liquid heating devices and to methods of heating a liquid. An ohmic liquid heater includes a structure for containing the liquid to be heated and a plurality of electrodes spaced apart from one another. The electrodes are contacted with the fluid to be heated so that the liquid fills the spaces between neighboring electrodes. An electrical voltage is applied between electrodes and a current passes between the electrodes through the liquid so that the liquid is heated by power dissipated in the electrical resistance of the liquid itself. The heating rate varies with the square of the current and varies inversely with the electrical resistance of the liquid between the energized electrodes. The current varies with the conductivity of the liquid. For a liquid of a given conductivity, the current varies with the spacing between the electrodes. Closely spaced electrodes provide a low-resistance conduction path and thus provide a high current and a high heating rate. The current and the heating rate also vary with the area of the electrodes; larger electrodes provide higher currents. The term "specific resistance" is used in this disclosure to characterize a circuit or a part of a circuit having elements electrically connected by a liquid. As used in this disclosure, the specific resistance is the ratio between the electrical resistance of the circuit or part of the circuit and the electrical resistivity of the liquid in the circuit.

Some ohmic heaters use numerous pairs of electrodes of different sizes, different spacings, or both; so that different pairs of electrodes provide different specific resistances. For example, the electrodes of each pair may be elements which confront one another so as to define a space between them. A liquid flow path may extend from an inlet through the spaces defined by the various pairs to an outlet so that fluid passing through the heater passes between the electrodes of the various pairs in sequence. In other arrangements, the flow path may have multiple channels arranged so that liquid passes through the spaces between the various pairs of electrodes in parallel. The desired heating rate can be achieved by selecting pairs of electrodes and connecting the electrodes of each pair to opposite poles of a fixed-voltage power supply such as a utility power connection. In other arrangements, the electrical power supply is operative to vary the voltage applied between energized pairs of electrodes so as to provide the desired heating rate. As disclosed, for example, in U.S. Provisional Patent Application 62/937,877, filed Nov. 20, 2019, (the "'877 Applications") the disclosure of which is incorporated by reference herein, these approaches may be combined with one another.

The heating rate necessary to provide a desired liquid temperature at the outlet varies with the desired liquid temperature, the inlet liquid temperature, and the flow rate of the liquid through the heater. An ohmic heater can be controlled simply by measuring the outlet temperature, determining the deviation of the outlet temperature from a set point temperature, and adjusting the heating rate in response to this deviation. However, such a simple feedback control loop does not provide an optimum combination of fast response and stability. For that reason, some ohmic heaters measure inlet temperature and flow rate and determine the heating rate which should be applied based in whole or in part on these measured parameters. The flow sensors which have been used for this purpose suffer from certain drawbacks. For example, turbine-wheel sensors can be disabled by particulates in the water. For example, when applied in an ohmic heater used to heat water in a plumbing system, a turbine wheel sensor can be disabled by particles remaining in the plumbing system from construction of the system. Thermal systems which employ a heated probe in the flow channel and monitor the rate of heat transfer from the probe to the water can become inaccurate due to scale deposits on the probe which impede heat transfer. Systems which use ultrasound transmitted through the flowing liquid and determine the flow rate based on the Doppler effect are costly. Thus, further improvement would be desirable.

SUMMARY

One aspect of the invention provides a flowmeter for measuring flow of an electrically conductive liquid. The flowmeter according to this aspect of the invention desirably includes a structure defining a flow path having an inlet, an outlet, a downstream direction from the inlet towards the outlet, and an upstream direction opposite to the downstream direction, as well as a first pair of electrodes exposed within the flow path. The flowmeter desirably further includes an electrical circuit operative to apply a voltage between the first pair of electrodes so that an electrical current flows along a first conduction path between electrodes of the first pair within a liquid flowing downstream in the flow path, and means for determining a value representing a temperature rise in the liquid passing through a first sensing region of the flow path, the first sensing region encompassing at least a part of the first conduction path. Most desirably, the flowmeter includes a monitoring circuit for determining a value representing a flow rate of the liquid through the flow path based at least in part on the value representing the temperature rise, the voltage and the current. The flowmeter may include a current sensor connected in the electrical circuit in series with the first pair of electrodes, the monitoring circuit being operative to determine the current based on a signal from the current sensor. The flowmeter may also include a voltage sensor connected in parallel with the first pair of electrodes, the monitoring circuit being operative to determine the voltage based on a signal from the voltage sensor. Alternatively, the circuit may include a power source operative to apply a known voltage between the first pair of electrodes. The means for determining a value representing temperature rise may include conventional temperature sensors such as thermocouples, thermoresistive elements and the like, or may include means for determining a parameter representing electrical conductivity of the liquid.

A further aspect of the invention provides a heater which includes one or more heating elements, a flowmeter as discussed above and a controller operative to control operation of the one or more heating elements based at least in part on the value representing the flow rate so as to heat the liquid flowing in the flow path to a set outlet temperature. The heater may be an ohmic heater in which the heating elements including a plurality of electrodes, the heater being arranged to heat the liquid by passing electric current through the liquid between the electrodes. In certain embodiments, heating electrodes may serve as the first pair of electrodes used in the flowmeter.

Further aspects of the invention provide methods of measuring the flow rate of a conductive liquid by passing applying a voltage between electrodes in contact with the liquid so that a current passes through the liquid along a current path between the electrodes, determining a value representing temperature rise of the liquid in a sensing region encompassing at least a part of the conduction path, and determining a value representing the flow rate of the liquid based on the value representing temperature rise, the current and the voltage. The method desirably further includes the step of controlling operation of a heater responsive to the value representing flow rate.

BRIEF DESCRIPTION OF THE DRAWINGS

FIG. 1 is a diagrammatic, partially sectional view depicting a flowmeter according to one embodiment of the invention.

FIG. 2 is a fragmentary sectional view depicting a portion of a flowmeter according to a further embodiment of the invention.

FIG. 3 is a fragmentary sectional view depicting a portion of a flowmeter according to yet another embodiment of the invention.

FIG. 4 is a diagrammatic, partially sectional view depicting a heater according to a further embodiment of the invention.

FIG. 5 is a diagrammatic sectional view depicting portions of a flowmeter according to yet another embodiment of the invention.

DETAILED DESCRIPTION

A flowmeter according to one embodiment of the invention (FIG. 1) includes structure 220 defining a flow path 222 extending in a downstream direction D, the flow path also having an upstream direction U opposite to the downstream direction. In this embodiment, structure 220 is formed from a dielectric material. Electrodes 234a and 234b are disposed within flow path 222. In this embodiment, electrodes 234a and 234b are of the same size and are aligned with one another in the downstream direction, so that the electrodes confront one another over their upstream to downstream extent. Electrodes 234a and 34b are spaced apart from one another in a direction perpendicular to the downstream direction. These electrodes may be generally plate-like or sheet-like structures, although other configurations can be used. Although electrodes 34a and 34b in this embodiment are mounted to the wall of structure 20, this is not essential; the electrodes may be spaced from the wall if desired. A power source 240 is connected to electrodes 234a and 234b through a switch 202 so that the power source applies a voltage between the electrodes when the switch is closed. In this embodiment, the power source applies an alternating voltage between the electrodes. When switch 202 is closed and an electrically conductive liquid is present in flow path 222, an electrical current flows between the electrodes along a conduction path 201 through the liquid, indicated by the lines extending between the electrodes. In this instance, essentially all of the current passes through the liquid in the region between the electrodes and in the regions just upstream and downstream of the electrodes, so that the conduction path can be taken as including only these regions. A current sensor 252 is connected in series with the electrodes and hence in series with the conduction path. A voltage sensor 254 is connected in parallel with the conduction path, so that the voltage sensor detects the voltage applied between the electrodes.

A first or upstream temperature sensor 256 is disposed in the flow path upstream of electrodes 234a and 234b, whereas a second or downstream temperature sensor 258 is disposed downstream of sensor 256 and downstream of these electrodes. The region 215 of the flow path between sensors 256 and 258 is referred to herein as a "sensing region." The upstream and downstream ends of this sensing region are indicated schematically by broken lines 11 and 13. This region encompasses the conduction path 201 between electrodes 234a and 234b. Stated another way, when a voltage is applied between electrodes 234a and 234b, essentially all of the current will flow between the electrodes through the liquid within region 215. Sensor 256 provides a signal representing an upstream temperature, i.e., the temperature of liquid in the path upstream of sensing region 215. The signal from sensor 258 represents a downstream temperature, i.e., the temperature of liquid in the flow path just downstream of region 215.

The sensors are connected to a monitoring circuit 203 which is arranged to receive the signals from the sensors 252, 254, 256 and 258 and to provide an output value representing the flow rate of an electrically conductive liquid along the flow path 222. In this instance, each temperature sensor is arranged to provide an analog signal such as a voltage and the monitoring circuit 203 includes a differential amplifier 205 which is arranged to provide a signal representing the difference between the downstream temperature measured by sensor 258 and the upstream temperature as measured by sensor 256, i.e., downstream temperature minus upstream temperature. This difference is the temperature rise $\Delta T$ of liquid flowing downstream through the sensing region 215 of the flow path. The monitoring circuit also includes a calculation circuit 207 arranged to perform other calculations as discussed below. Circuit 207 may include analog, digital or both analog and digital components for performing the other calculations as discussed below. For example, the calculation circuit may include a programmable microprocessor together with a memory storing instructions and parameters as discussed below. In a variant, differential amplifier 256 may be omitted and the temperature sensors 256 and 258 may be connected to the calculation circuit 207 so that the calculation circuit receives separate signals representing the upstream and downstream temperatures. In this variant, the calculation circuit may determine the temperature rise $\Delta T$.

The electrical resistance in the conduction path 201 between electrodes 234a and 234b and is much larger than the resistance of the conductors extending between power source 240 and the electrodes. Thus, essentially all of the power applied by source 240 is dissipated between the electrodes. The power dissipated in the conduction path 201 is the root mean square voltage measured by voltage sensor 254 multiplied by the root mean square current measured by current sensor 252, multiplied by the power factor. Because the conduction path 201 is essentially a resistive load, the power factor is unity and thus the power dissipated in the circuit is simply the root mean square voltage measured by voltage multiplied by the root mean square current.

Assuming that the flow rate of the liquid through the heater is constant or nearly constant during a sensing interval, the temperature rise $\Delta T$ stabilizes at a constant value when the sensing interval has continued for a time greater than that required for the liquid to pass through the sensing region 215. Assuming further that any effect of heat transfer between the liquid passing through the sensing region and elements of the heater (the electrodes 234a and 234b and the adjacent portion of structure 20) is small in comparison to the power dissipated, the temperature rise at this constant value is related to the mass flow rate of the liquid as follows:

$$P = \Delta T \sigma M \quad \text{(Equation 1)}$$

Where:
P is the power dissipated;
ΔT is the temperature rise;
σ is the specific heat of the liquid; and
M is the mass flow rate.
Rearranging Equation 1, $$M = \frac{P}{\Delta T \sigma} \quad \text{(Equation 2)}$$

Calculation circuit 207 may be arranged to compute the power P based on the signals from the current and voltage sensors 252 and 254, and compute the mass flow rate M based on using a stored value of σ based on the known composition of the liquid. Where the liquid is water, σ is equal to approximately 4200 J/kg-° C. at room temperature.

In embodiment of FIG. 1, the sensing region entirely encompasses the conduction path between the electrodes, so that all of the electric power dissipated in the conduction path between the electrodes is dissipated within the sensing region. However, this is not essential. A flowmeter according to a further embodiment of the invention (FIG. 2) has electrodes 334a and 334b offset from one another in the upstream and downstream directions along the flow path 322. An upstream temperature sensor 356 and a downstream temperature sensor 358 are disposed in the flow path. Sensors 356 and 358 define a further sensing region 315 within the liquid flow path, depicted as bounded by broken lines 311 and 313. Sensing region 315 encompasses a portion of the conduction path between electrodes 334a and 334b, the conduction path being schematically indicated as bounded by lines 301. In this instance, all of the current passing between electrodes 334a and 334b passes through sensing region 315. The electrical resistance of that portion of the conduction path within sensing region 315 is a substantially fixed proportion of the electrical resistance between electrodes 334a and 336b, with only minor deviations due to variation in the electrical resistivity of the liquid with temperature. Thus, the voltage through that portion of the conduction path is a substantially fixed portion of the voltage applied between the electrodes. Therefore, the power dissipated within region 315 is equal to the power P dissipated in the entire conduction path multiplied by a coefficient C equal to this proportion. In this case, the controller can determine the flow rate using Equation 3, below:

$$M = \frac{PC}{\Delta T \sigma} \quad \text{(Equation 3)}$$

In Equation 3, C has the meaning discussed above and ΔT is the difference between the downstream temperature measured by sensor 356 and the upstream temperature measured by sensor 358, the other terms have the same meaning as discussed above with reference to Equation 2. The value of C at a given upstream temperature may be determined by calibration, as by measuring the temperature rise for the entire conduction path using calibration sensors (not shown) upstream of electrode 334a and downstream of electrode 334b. C is equal to ΔT within region 315 divided by ΔT for the entire conduction path. In other respects, the flowmeter of FIG. 2 is similar to the flowmeter of FIG. 1 For example, the flowmeter of FIG. 2 includes a monitoring circuit (not shown) similar to that discussed above with reference to FIG. 1. The circuit may treat C as a constant in Equation 3. Optionally, the calibration may be repeated using liquid at different inlet temperatures so as to compile a set of values for C at different upstream temperatures as measured by sensor 356, different downstream temperatures as measured by sensor 358, or both. The calculation circuit may store a 1- or 2-dimensional lookup table relating one or both of these temperatures to values of C, and may determine C using conventional interpolation techniques. Alternatively, the coefficient C can be determined by mathematical modelling of the conduction path as, for example, a finite element analysis.

A flowmeter according to a further embodiment of the invention (FIG. 3) is also similar to the flowmeter of FIG. 1, but has upstream and downstream temperature sensors 456 and 458 which defines a sensing region 415 disposed inside the space between electrodes 434a and 434b, so that only a portion of the entire current passing between these electrodes will pass through the sensing region 415. In this arrangement, the voltage across sensing region 415 is simply the voltage between electrodes 436a and 436b. Here again, the fraction of the power dissipated between the electrodes which is dissipated within the sensing is substantially constant, so that Equation 3 is applicable in this case as well. The coefficient C can be determined in substantially the same way as discussed above.

Temperature sensors which are closely spaced with one another in the downstream direction, such as sensors having a relatively small length in the downstream direction, and thus can provide faster response time and allow a shorter sensing interval.

The foregoing discussion assumes that each temperature sensor will accurately measure the average temperature of the liquid flowing downstream past the sensor. In some cases, the liquid temperature may be non-uniform in directions transverse to the downstream direction. For example, in a laminar flow condition, the liquid adjacent the walls and electrodes will have lower velocity in the downstream direction than the liquid at the centerline of the flow path, so that the liquid adjacent the wall will be exposed to the current for a longer time in passing through the sensing region and thus will be heated more. In this case, a temperature sensor which measures temperature only at one point may give an inaccurate reading, and a pair of such sensors disposed upstream and downstream of the sensing region may yield a measured value of the temperature rise ΔT which differs from the correct value. Several approaches can be used to minimize or compensate for this effect. For point sensors at fixed locations, the error, i.e., the difference between the measured value of ΔT and the correct value is a function of the applied electrical power. The error is also a function of the flow rate, and thus is a function of the measured value of ΔT. The controller may use a lookup table containing values of the error in ΔT or the corresponding error in the flow rate M determined by experiment or by mathematical modelling.

Alternatively or additionally, each temperature sensor may be arranged to detect liquid temperature at multiple locations distributed in one or more directions transverse to the downstream direction and return an average temperature value. For example, an elongated sensor formed from a material having resistivity which varies with temperature may extend in one or more directions transverse to the downstream direction, so that the electrical resistance of the sensor represents an average temperature. Alternatively or additionally, the flowmeter may incorporate features such as vanes arranged to promote mixing of the fluid as it passes downstream.

The calculation circuit need not perform multiplication and division operations such as those set forth in Equation 2 and Equation 3; it may reach the equivalent results using one or more lookup tables and interpolation. Also, the calculation circuit need not calculate the mass flow rate M expressly; it may calculate any value which represents the mass flow rate. For example, where the specific heat of the liquid is constant or close to constant over the range of liquid temperatures encountered in service, the calculation circuit may simply omit the specific heat a in Equation 2 and Equation 3, so as to determine a value proportional to the mass flow rate. This value may be used instead of the actual mass flow rate for control of the heater. In a case where the voltage applied between the electrodes is substantially fixed, as, for example, where the power source 240 applies a fixed voltage, the power P dissipated between the electrodes can be calculated based on this fixed voltage and the measured current. If the voltage is fixed and the conductivity of the liquid is also constant, the current is also fixed and therefore the power P dissipated between the electrodes is also a fixed quantity. In this instance, the temperature rise $\Delta T$ in the sensing region is inversely proportional to the flow rate. In this instance, the signal from differential amplifier 205 (FIG. 1) can be used directly as a signal representing the inverse of the flow rate multiplied by a known constant based on the known power and hence based on the known voltage and current. Stated another way, in applications where the voltage and the conductivity, and hence the current, are constant or nearly constant, a value representing the temperature rise can be used without further processing as a value representing the flow rate, such value being implicitly based on the voltage and current.

The sign of the temperature rise indicates the direction of the fluid flow. If the liquid is flowing downstream as discussed above, the temperature rise obtained by subtracting the upstream temperature from the downstream temperature will be positive. If the liquid is flowing upstream, the sign will be negative. The sign of the mass flow rate computed as discussed above will also change with the flow direction.

In the discussion above, it is assumed that heat transfer between the liquid and elements of the flowmeter is small in comparison to power P applied between the electrodes, and thus can be neglected. Optionally, measures can be taken to minimize or compensate for errors caused by heat transfer. The error under steady-state conditions, after a long sensing interval, can be minimized by thermal insulation (not shown) surrounding the structure of the flowmeter. Also, the error under steady-state conditions can be compensated by applying a correction to $\Delta T$ based on the measured downstream upstream or downstream temperature and the ambient temperature outside of the structure.

However, the error caused by heat transfer can prolong the time required for $\Delta T$ to stabilize, and thus increase the response time of the flowmeter. For example, assume that switch 202 (FIG. 1) is open for a long time, and then closed at the beginning of a sensing interval. At the beginning of the sensing interval, the electrodes and the adjacent portions of the structure may be significantly colder than the temperature attained by the liquid in contact with them during the sensing interval. In a further variant, the calculation circuit can monitor the measured $\Delta T$ several times during the sensing interval, predict the stable value for an actuation interval of infinite length based on these measurements and use the predicted value to determine the flow rate. For example, the controller may base the prediction on an assumption that the error declines exponentially with time, as represented by $$\Delta T_{SS} = \Delta T_t + X t^{-Y} \qquad \text{(Equation 4)}$$

Where:
t is time after the downstream temperature begins to rise;
$\Delta T_t$ is the measured value at time t
$\Delta T_{SS}$ is the error at time t equal to infinity; and
X and Y are coefficients.

Using plural values of $\Delta T_t$ acquired at different times t, the calculation can select values of the coefficients which provide the best fit to the measured values, and then compute $\Delta T_{SS}$. The value of $\Delta T_{SS}$ computed in this manner can be taken as the value of $\Delta T$ for computation of the flow rate.

The flowmeters and flow measurement techniques discussed above can be employed in any application where flow of an electrically conductive liquid must be monitored. However, they are particularly advantageous when used in an ohmic heater. A heater in accordance with one embodiment of the invention is shown in FIG. 4. The particular ohmic heater is merely exemplary; numerous other arrangements can be employed. The ohmic heater depicted is in generally in accordance with U.S. Provisional Patent Application 62/937,877, filed Nov. 20, 2019, the disclosure of which is incorporated by reference herein. The heater includes a structure 20 defining a flow path 22 extending in a downstream direction denoted by arrow D in FIG. 1 from an inlet end 24 to an outlet end 26. The flow path in this embodiment includes an elongated passage 32.

Electrodes 34a and 34b are disposed within the straight section of flow path 22 adjacent the inlet end of the flow path. In this embodiment, the electrodes 34a and 34b are of the same size and are aligned with one another in the downstream direction, so that the electrodes confront one another over their entire upstream to downstream extent. Electrodes 34a and 34b are spaced apart from one another in a direction perpendicular to the downstream direction. The electrodes are disposed within the flow path 22 so that the electrodes will contact a liquid flowing in the flow path. Desirably, structure 20 is formed in whole or in part from a dielectric material, so that the structure does not form an electrical connection between the electrodes.

Additional electrodes 36a and 36b are disposed in the straight section of the flow path adjacent the downstream end 26, downstream of passage 32. In this embodiment, electrodes 36a and 36b are adjacent one another and aligned with one another in the downstream direction but are spaced from one another in a direction perpendicular to the downstream direction. In this particular embodiment, second electrodes 36a and 36b are larger in area and closer to one another than first electrodes 34a and 34b. Therefore, a conduction path through the liquid in the flow path between the electrodes 36a and 36b will have a lower specific resistance than a conduction path through the fluid between electrodes 34a and 34b. In operation, electrical currents are applied through electrodes 34a, 34b, 36a and 36b to heat the liquid in the flow channel. Accordingly, these electrodes are referred to herein as "heating" electrodes.

The heater further includes a variable voltage power source 40. Power source 40 has a first pole 42 and a second pole 44. In this instance, the first pole 42 is a neutral pole, whereas the second pole 44 is a "hot" pole. The power source 40 is arranged to supply electrical power and apply a voltage between poles 42 and 44, which can be controlled and varied as desired over an operating range of voltages. Typically, the power supply applies an alternating voltage to the hot pole while maintaining the neutral pole at a fixed voltage, which may be close to or equal to a ground voltage.

Electrode 34a is connected to the neutral pole 42 of the power supply through a switch 45, whereas electrode 34b is connected through a switch 46 to the hot pole 44 of the power supply. Electrode 36a is connected through a switch 48 to the neutral pole 42 of the power supply, whereas the electrode 36b is connected through a further switch 50 to the hot pole 44 of the power supply. Switches 46, 48, and 50 are depicted in FIG. 1 as conventional mechanical switches, but most typically the switches 46, 48, and 50 are semiconductor switches such as FETs, MOSFETs or the like, which can be controlled electronically. Thus, the circuit can apply the voltage supplied by power source 40 between any combinations of the electrodes.

The heater further includes a current sensor or ammeter 52 arranged to detect the current flow from the power source 40 and a voltage sensor 54 arranged to detect the voltage between poles 42 and 44.

The heater further includes a controller 60. The controller 60 is connected to switches 45, 46, 48, and 50, and to the power source 40 so that the controller can command each of the switches independently to enter into a closed state in which the switch conducts or an open state in which the switch does not conduct. The controller is also connected to the power source 40 and is arranged to command the power source to increase or decrease the applied voltage between poles 42 and 44. Controller 60 is also connected to the sensors discussed above so that the controller can receive signals from the sensors. The connections between the controller and the sensors and the connections between the controller and the switches, are omitted for clarity of illustration in FIG. 1. Controller 60 may include conventional analog or digital circuit elements arranged to perform the operations discussed below. Most typically, the controller includes a digital processor and a memory containing stored instructions directing the processor to perform the operations. The controller typically also includes appropriate circuits for interfacing with the sensors and with the switches as, for example, analog-to-digital and digital-to-analog conversion circuits.

The electrical circuit is arranged to connect electrodes selectively to the poles of the power supply and thus selectively form one or more energized pairs. In the state depicted in FIG. 1, with all of the switches open, the heater is inactive. When switches 45 and 46 are closed, the electrodes 34a and 34b these electrodes form an energized pair of electrodes connected to opposite poles of the power source 40, so that the voltage supplied by the power supply is applied between electrodes 34a and 34b. In this condition, current will flow between these electrodes through the liquid present in flow path 22. Likewise, with switches 48 and 50 closed, electrodes 36a and 36b form an energized pair connected to the opposite poles 42 and 44 of the power supply. In this condition, current flows between electrodes 36a and 36b through the fluid in the space between these electrodes. In another operating condition, switches 45 and 50 are closed and the other switches are open, so that electrodes 34a and 36b form an energized pair. In this state, the only conduction path between the poles of the power supply through any of the electrodes extends between electrode 36b of the second pair and electrode 34a of the first pair, through passage 30. This configuration provides a high specific resistance. In another condition, with all of the switches closed, the electrodes 34a and 34b are connected to opposite poles of the power supply, and electrodes 36a and 36b of the second pair are also connected to opposite poles of the power supply, so as to provide a low specific resistance.

As discussed above, the heater as a whole can provide four different specific resistances. These specific resistances can be selected so as to cover a broad range with relatively large steps between specific resistances. Typically, the power source 40 has a finite operating range. For example, a voltage source typically will be capable of applying no more than a predetermined maximum voltage between poles 42 and 44, and also will be capable of applying no more than a maximum current through the poles and switches without damage to the power supply or switches. Desirably, the specific resistances provided in the various states are selected so that for any liquid within a predetermined range of conductivities, any heating rate within a predetermined operating range of heating rates can be provided by selecting one of the states discussed above and adjusting the power source through a condition within its operating range.

The heater includes a plurality of temperature sensors disposed in the flow path so as to define sensing regions within the flow path. For example, temperature sensors 56 and 58 cooperatively define a sensing region 22, disposed between lines 11 and 13. This sensing region encompasses the conduction path between heating electrodes 34a and 34b. Sensors 58 and 74 define a further sensing region 77, depicted as bounded by lines 13 and 17. This sensing region encompasses a part of the conduction path between electrodes 34a and 36b. Sensors 70 and 72 define a further sensing region encompassing the entire conduction path between electrodes 36a and 36b, whereas sensors 80 and 82 define yet another sensing region which encompasses a part of the conduction path between the same electrodes. Controller 60 is connected to the temperature sensors either directly or through one or more differential amplifiers as discussed above with respect to FIG. 1., and is arranged to perform the functions of monitoring circuit the monitoring circuit using temperature rise information obtained from the temperature sensors and current and voltage information from the current sensor 52 and voltage sensor 54 to determine the flow rate through the heater while electric power is applied by power source 40. Stated another way, in an ohmic heater, components such as the heating electrodes, power source, current sensor and voltage sensor can serve as the corresponding components of one or more flowmeters.

Typically, controller 60 actuates the power source and switches in a series of intervals referred to herein as "actuation intervals". The controller maintains the selection of electrodes as energized electrodes and the setting of power source constant during each actuation interval, and changes these conditions if necessary between actuation intervals. For example, in one actuation interval, the controller may place the system into the condition where switches 45 and 46 are closed and the other switches are open, so that electrodes 34a and 34b constitute an energized pair. In this condition, current sensor 52 is in series with the energized pair so that the current measured by sensor 52 represents the current passing through the energized pair 34a and 34b. Also, in this condition, voltage sensor 54 is electrically connected in parallel with the two electrodes of the energized pair. During this actuation interval, controller 60 repeatedly samples values of the voltage and current and calculates the power dissipated between electrodes 34*a* and 34*b*, and monitors the flow rate using temperature rise information obtained from sensors 56 and 58 associated with sensing region 15 which encompasses the conduction path between these electrodes. In other actuation intervals when other electrode pairs are energized, the controller can acquire temperature rise information from other sensors. Thus, during each actuation interval, the controller may acquire temperature rise information from sensors associated with a sensing region encompassing at least a part of conduction path between a pair of heating electrodes which are energized during that particular interval. As discussed above in connection with FIGS. 1-3, the controller can determine the mass flow rate based on the temperature rise information.

In a simple feed-forward control scheme, the controller may use the mass flow rate to calculate the heating rate required to bring the temperature of the liquid to a desired set point temperature the switches and power supply based on the mass flow rate, the inlet temperature of the liquid and the desired outlet temperature, and set the switches and the power supply so as to dissipate power in the liquid at a rate equal to the required heating rate during subsequent actuation intervals. If the switch setting selected by the controller to yield the required heating rate does not call for an arrangement in which electrical power is dissipated within a sensing region, the controller may intermittently or periodically reset the switches to such an arrangement during certain actuation intervals and use those actuation intervals as sensing actuation intervals to monitor the flow rate in the same manner as discussed above.

In a more elaborate control system, the controller may use the flow rate data in combination with other data as, for example, outlet temperature as measured by a further temperature sensor 70 downstream of all of the electrodes. For example, the controller may initially select the required heating rate based on the flow rate and inlet temperature as described above and subsequently select a new heating rate based on comparison of the outlet temperature with a set point temperature alone or in combination with the flow rate and inlet temperature data.

The controller desirably responds to changes in the required heating rate by adjusting the voltage applied by power supply 40 unless the required voltage, or the resulting current, would exceed the operating range of the power supply. Thus, unless the new heating rate required would exceed the operating range of the power supply, the controller maintains the same set energized pairs of electrodes in operation during successive actuation intervals. Thus, at the beginning of a given actuation interval, the heating electrodes serving as the electrodes of the flowmeter and the portions of the structure near the sensing region are close to the temperature which the liquid passing through the sensing region will attain during that actuation interval. This minimizes the response time of the flowmeter.

In the embodiment discussed above, the same voltage is applied to all energized pairs through poles 42 and 44. In other embodiments, the circuit may include elements which can apply different voltages to different energized pairs of electrodes. For example, in the embodiment of FIG. 1, the power source 40 may be arranged to provide a fixed voltage, and the controller may be arranged to repeatedly open and close the switches associated with the various electrodes so as to apply a pulse width modulation to the fixed voltage so as to vary the time average voltage. The time average voltage applied to each energized pair used for flow sensing can be ascertained individually, either by measuring the voltage using separate voltage sensors (not shown) connected in parallel with the energized pair or by ascertaining the pulse width modulation commanded by the controller.

The embodiment discussed above with reference to FIG. 1 includes numerous temperature sensors so as to allow flow rate measurement in any operating state and to reduce response time. In practice, fewer sensors can be used, down to a minimum of two sensors.

In a further alternative, the heater may include a pair of electrodes specifically designated as sensing electrodes, and these sensing electrodes may be continually energized at a relatively low power level while the heater is in operation. The heater may continually monitor $\Delta T$ in a sensing region encompassing at least a part of the conduction path between these electrodes, using temperature sensors upstream and downstream of the sensing region as discussed above.

The heater may include any number of heating electrodes greater than or equal to 2. Typically, the heater will include safety features such as ground electrodes (not shown) disposed in the flow path upstream and downstream from the electrodes connectable to the power supply, the ground electrodes being permanently connected to ground potential.

The techniques and apparatus discussed above can provide accurate, inexpensive and reliable flow measurement. Many of the components required for flow measurement, such as the electrodes, voltage sensor and current sensor are already provided in the ohmic heater for other purposes. Typically, one or more of the temperature sensors is also provided in the heater for other purposes, such as for measuring the inlet temperature or outlet temperature. Additional temperature sensors are relatively inexpensive. The apparatus is substantially uninfluenced by contaminants in the liquid such as particulate matter. Moreover, the flow measurement components do not appreciably increase the size of the heater.

In the embodiments discussed above, temperature sensors upstream and downstream of each sensing region, alone or together with elements of the monitoring circuit or control circuit, perform the function of determining a value representing the temperature rise of the liquid in each sensing region. In a further embodiment, this function can be performed by one or more elements which determine a value representing the electrical conductivity of the liquid in the flow path. Desirably, these elements measure a change in the conductivity which is caused by heating of the liquid in the sensing region. The electrical conductivity of many liquids changes with temperature. For example, the electrical conductivity of water increases with temperature.

In one example, the flowmeter discussed above can be modified by omitting temperature sensors 256 and 258. In this modified embodiment, the calculation circuit receives signals from the current sensor 252 and voltage sensor 254 and determines a value of a parameter representing the electrical conductance (or its inverse, the electrical resistance) between electrodes 234*a* and 234*b*. Because the electrical conductance is directly related to the conductivity of the liquid in the conduction path 201, the conductance also represents the conductivity of the liquid in the conduction path 201 within sensing region 215, which is the inverse of its resistivity. In the case where the power source 240 is arranged to apply a constant voltage, the voltage sensor 254 may be omitted, and the parameter representing conductance may be simply the magnitude of the electrical current as measured by the current sensor. The monitoring circuit may acquire a first value of the parameter when switch 202 is initially closed to begin passage of current through the current path and then acquire a second value of the parameter at a later time after the current has passed through the current path. The difference in conductivity represents the temperature rise of the liquid in the current path over time. This rise in temperature is inversely related to the flow rate.

In another example, temperature sensors 256 and 258 may be replaced by a first pair of conductivity measurement electrodes (not shown) disposed upstream of sensing region 215 and a second pair of conductivity measurement electrodes disposed downstream of the sensing region. These electrodes may be connected to the same power source as electrodes 234*a* and 234*b* or to a different power source, and a current sensor is arranged in series with each pair of conductivity measurement electrodes. The monitoring circuit may continually monitor the conductance or resistance between each pair of conductivity measurement electrodes. The difference between the conductivity of the liquid as measured by the second or downstream pair of conductivity measurement electrodes and the conductivity as measured by the first or upstream pair of conductivity measurement electrodes represents the temperature rise of the liquid as it passes through the sensing region 215. Stated another way, in this embodiment each pair of conductivity measurement electrodes acts as a temperature sensor.

The flowmeters discussed above with reference to FIGS. 2 and 3, and the heater as discussed above with reference to FIG. 4 can be modified in the same ways as discussed in the preceding paragraphs. Where the conductivity of the liquid varies non-linearly with temperature, the monitoring circuit can convert conductivity of the liquid to temperature using a lookup table or the like.

The flowmeters discussed herein also can be applied in cases where substantial heating of the liquid is not desired. In this case, the structure 510 (FIG. 5) may include a main liquid flow path 501 and a branch liquid flow path 503 having a greater resistance to liquid flow than the main flow path, the branch flow path and main flow path being connected in parallel with one another. The branch flow path 503 may be equipped with a flowmeter as discussed above, schematically indicated at 505 so that the flowmeter directly measures the flow along branch 503. Because the ratio of flow through branch flow path 503 to the flow in main flow path 501 is known, the total flow through both paths can be determined. The electrical current applied in flowmeter 505 may create an appreciable temperature rise in the small part of the liquid passing through the branch flow path so that this temperature rise can be measured accurately. However, this fluid will mix with the liquid in the main path after passage through the branch flow path, so that the temperature rise of the liquid as a whole can be very small. Moreover, the power consumed by the flowmeter will be much smaller than that required by a similar flowmeter operating on the entire liquid flow.

Numerous variations and combinations of the features discussed above can be employed. Accordingly, the foregoing description of certain embodiments should be taken as illustrating, rather than as limiting, the present invention.

The invention claimed is:

1. A flowmeter for measuring flow of an electrically conductive liquid comprising:
   (a) a structure defining a flow path having a downstream direction and an upstream direction opposite to the downstream direction;
   (b) a first pair of electrodes exposed within the flow path;
   (c) an electrical circuit operative to apply a voltage between the first pair of electrodes so that an electrical current flows along a first conduction path between electrodes of the first pair within a liquid flowing in the flow path,
   (d) means for computing an amount of temperature rise in the liquid passing through a first sensing region of the flow path, the first sensing region encompassing at least a part of the first conduction path; and
   (e) a monitoring circuit for computing a flow rate of the liquid through the flow path using at least the computed amount of temperature rise and an amount of power dissipation.

2. A flowmeter as claimed in claim 1 further comprising a current sensor connected in the electrical circuit in series with the first pair of electrodes, the monitoring circuit being operative to determine the current based on a signal from the current sensor.

3. A flowmeter as claimed in claim 2 further comprising a voltage sensor connected in parallel with the first pair of electrodes, the monitoring circuit being operative to determine the voltage based on a signal from the voltage sensor.

4. A flowmeter as claimed in or claim 2 wherein the circuit includes a power source operative to apply a known voltage between the first pair of electrodes.

5. A flowmeter as claimed in claim 1 wherein the first sensing region encompasses only a part of the first conduction path.

6. A flowmeter as claimed in claim 1 further comprising a first temperature sensor disposed in the flow path upstream of the first sensing region and a second temperature sensor disposed in the flow path downstream of the first sensing region.

7. A flowmeter as claimed in claim 1 wherein the means for computing the amount of temperature rise includes means for determining a value of a parameter representing electrical conductivity of the liquid.

8. A flowmeter as claimed in claim 7 wherein the means for determining a change in a parameter representing electrical conductivity includes the first pair of electrodes and a current sensor connected in series with the first and second electrodes.

9. A heater comprising one or more heating elements, a flowmeter as claimed in any of claims 1-8 and a controller operative to control operation of the one or more heating elements based at least in part on the computed flow rate so as to heat the liquid flowing in the flow path to a set outlet temperature.

10. A heater as claimed in claim 9 wherein the one or more heating elements include the first pair of electrodes.

11. A heater as claimed in claim 10 wherein the one or more heating elements include the first pair of electrodes and one or more additional electrodes, the first pair of electrodes and the one or more additional electrodes constituting a plurality of heating electrodes, so that there are a plurality of conduction paths between pairs of heating electrodes, the plurality of conduction paths including the first conduction path and one or more additional conduction paths.

12. A heater as claimed in claim 11 wherein the circuit includes a power source and one or more switches, the controller being operative to actuate the switches so as to selectively connect different ones of the heating electrodes to the power source so that the heating electrodes which are connected to the power source form one or more energized pairs of electrodes and one or more currents flow between the electrodes of the energized pairs along one or more of the plurality of conduction paths.

13. A heater as claimed in claim 12 further comprising a set of temperature sensors, the set of temperature sensors defining a plurality of sensing regions, each sensing region being disposed between an upstream one of the set of temperature sensors and a downstream one of the set of temperature sensors, the plurality of sensing regions including the first sensing region, each sensing region encompassing at least a part of one of the conduction paths, the monitoring circuit being operative to compute the flow rate using an amount of temperature rise for any one of the sensing regions.

14. A flowmeter as claimed in claim 6 wherein the means for computing the amount of temperature rise comprises a microprocessor configured to:
- receive a first signal from the first temperature sensor disposed in the flow path upstream of the first sensing region,
- receive a second signal from the second temperature sensor disposed in the flow path downstream of the first sensing region, and
- compute the amount of temperature rise based on the first signal and the second signal.

15. A flowmeter as claimed in claim 14, further comprising:
- a current sensor connected in the electrical circuit in series with the first pair of electrodes, and
- a voltage sensor connected in parallel with the first pair of electrodes,
wherein the monitoring circuit comprises the microcontroller, and
wherein the microcontroller is further configured to:
- receive a signal from the current sensor to determine a current,
- receive a signal from the voltage sensor to determine a voltage, and
- determine the amount of power dissipated based on the determined current and the determined voltage.

16. A flowmeter as claimed in claim 15, wherein the microcontroller is configured to compute the flow rate of the liquid through the flow path using $$M = \frac{P}{\Delta T \sigma}$$

wherein:
M is the computed flow rate,
P is the computed amount of power dissipation,
$\Delta T$ is the computed amount of temperature rise, and
$\sigma$ is specific heat of the liquid.

17. A method of measuring a flow rate of a liquid comprising:
(a) passing a fluid in a downstream direction along a flow path so that the liquid contacts electrodes disposed in the flow path including a plurality of electrodes;
(b) during step (a), applying one or more voltages between an energized pair of the electrodes so that an electric current passes through the liquid along a conduction path between the energized pair;
(c) during step (b), computing an amount of temperature rise in the fluid in a sensing region of the flow path encompassing at least a part of the conduction path; and
(d) computing the flow rate using at least the computed amount of temperature rise and an amount of power dissipation.

18. A method as claimed in claim 17 wherein step (c) includes measuring an upstream temperature, by a first temperature sensor, upstream of a sensing region of the flow path encompassing at least a part of the conduction path and a downstream temperature, by a second temperature sensor, downstream of the sensing region.

19. A method as claimed in claim 17 wherein step (c) includes determining the a value of a parameter representing electrical conductivity of the liquid.

20. A method as claimed in any one of claims 17-19 further comprising controlling heating of the liquid based at least in part on the computed flow rate.

* * * * *